(12) United States Patent
Assandri et al.

(10) Patent No.: US 8,303,164 B2
(45) Date of Patent: Nov. 6, 2012

(54) LOW-PRESSURE-DROP MIXING DEVICE AND USE THEREOF IN THE MIXING OF TWO GASES/VAPOURS

(75) Inventors: Fabio Assandri, Mantova (IT); Giovanni Regattieri, Rodigo (IT); Paolo Bottoni, Mantova (IT)

(73) Assignee: Polimeri Europa S.p.A., San Donato Milanese (IT)

( * ) Notice: Subject to any disclaimer, the term of this patent is extended or adjusted under 35 U.S.C. 154(b) by 537 days.

(21) Appl. No.: 12/593,715

(22) PCT Filed: Mar. 19, 2008

(86) PCT No.: PCT/EP2008/002424
§ 371 (c)(1),
(2), (4) Date: Sep. 29, 2009

(87) PCT Pub. No.: WO2008/119499
PCT Pub. Date: Oct. 9, 2008

(65) Prior Publication Data
US 2010/0103766 A1 Apr. 29, 2010

(30) Foreign Application Priority Data
Mar. 29, 2007 (IT) .............................. MI2007A0627

(51) Int. Cl.
*B01F 5/04* (2006.01)
(52) U.S. Cl. .................... 366/181.6; 366/178.2; 366/336
(58) Field of Classification Search .............. 366/163.2, 366/178.2, 181.5, 181.6, 336; 137/602, 888, 137/892; 48/189.3
See application file for complete search history.

(56) References Cited

U.S. PATENT DOCUMENTS

| | | | | |
|---|---|---|---|---|
| 2,563,002 A * | 8/1951 | Bissell et al. | ............... | 366/163.2 |
| 3,129,673 A * | 4/1964 | Stanley et al. | ................ | 137/602 |
| 3,597,166 A | 8/1971 | Hochman | | |
| 4,573,551 A | 3/1986 | Schwerdtner et al. | | |
| 4,865,820 A | 9/1989 | Dunster et al. | | |
| 6,095,675 A * | 8/2000 | Tai | .............................. | 366/163.2 |
| 6,612,731 B2 * | 9/2003 | Nishida et al. | ............. | 366/173.2 |
| 8,147,121 B2 * | 4/2012 | Lacy et al. | ..................... | 366/134 |
| 2002/0021991 A1 | 2/2002 | Boyer et al. | | |

FOREIGN PATENT DOCUMENTS

| | | |
|---|---|---|
| DE | 103 60 839 | 6/2005 |
| EP | 0 087 643 | 9/1983 |
| EP | 0 303 439 | 2/1989 |
| EP | 1 180 393 | 2/2002 |

* cited by examiner

*Primary Examiner* — David Sorkin
(74) *Attorney, Agent, or Firm* — Oblon, Spivak, McClelland, Maier & Neustadt, L.L.P.

(57) ABSTRACT

Mixing device for two gases/vapours (hereinafter gases) comprising: a) a plurality of tubes arranged in a bundle (1), each provided, in its initial portion, with a plurality of side holes (5); b) a first feeding system of one of the two gases, comprising a first tubular body (6) situated on the inlet side of the tubes, and c) a second feeding system of the other gas comprising a second tubular body (7) that envelopes in a gas-proof way the tube bundle (1) and at least a portion of the first tubular body (6); characterized in that: d) the first feeding system of one of the gases comprises a plurality of fins (8), inside the first tubular body (6), which allow a uniform distribution of the feeding gas to the single tubes.

12 Claims, 1 Drawing Sheet

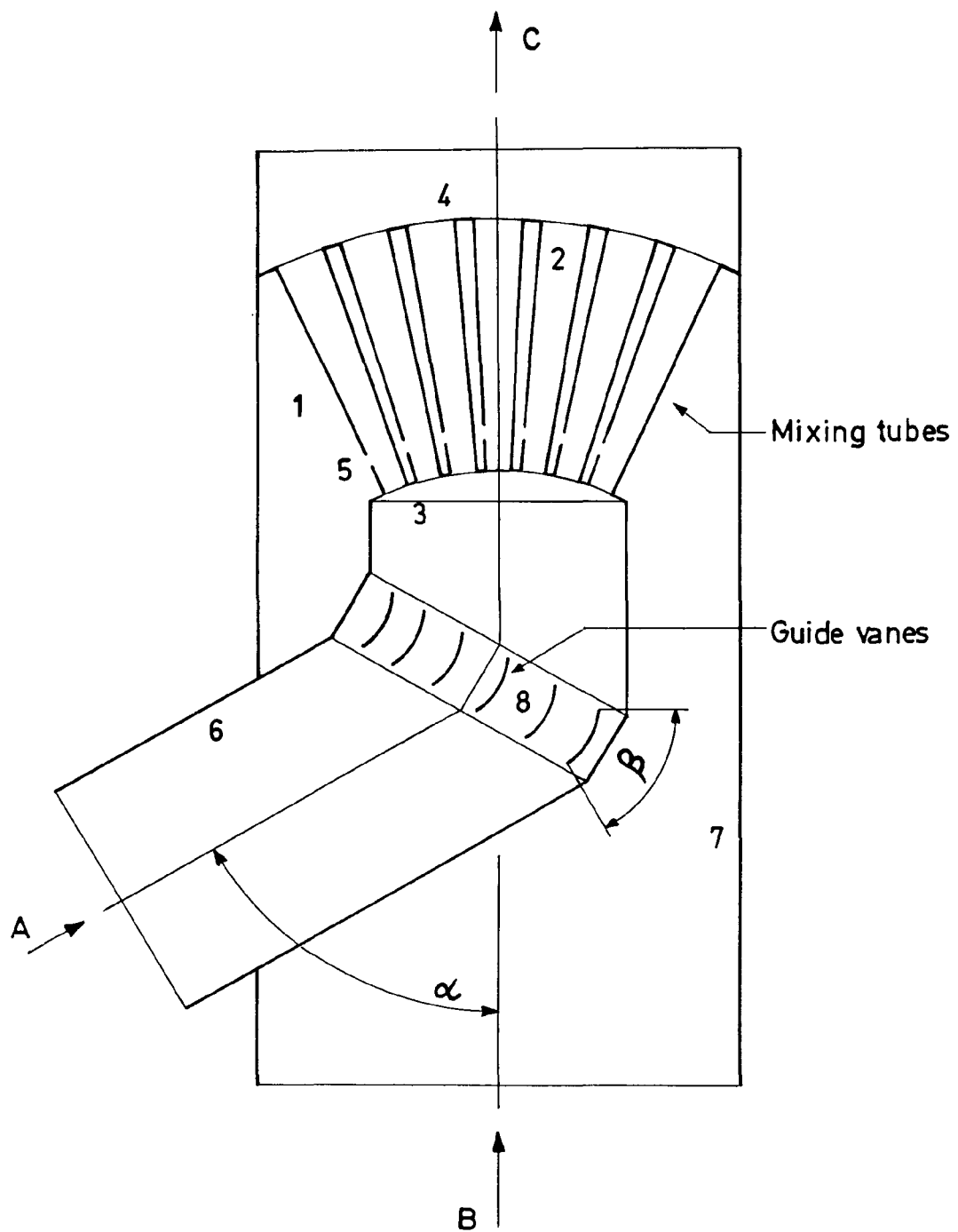

LOW-PRESSURE-DROP MIXING DEVICE AND USE THEREOF IN THE MIXING OF TWO GASES/VAPOURS

This application is a 371 of PCT/EP08/02424, filed March 19, 2008.

The present invention relates to a low pressure drop mixing device and the use thereof in the mixing of two gases/vapours.

More specifically, the present invention relates to a low-pressure-drop mixing device and the use thereof in the mixing of ethylbenzene and steam at a high temperature in styrene production units.

As is known, styrene monomer is mainly produced by the dehydrogenation of ethylbenzene at a high temperature on a fixed bed of a solid catalyst based on iron oxides mainly. Before entering the catalytic bed, the ethylbenzene is mixed with steam at high temperature, in order to improve the yield and reaction selectivity. The steam has the purpose of moving the reaction equilibrium towards styrene, heating the reagent mass and keeping the catalyst clean from carbonaceous precipitates, by forming water gas with the latter.

For these reasons, it is of fundamental importance that mixing between the two gases (ethylbenzene and steam) is as complete as possible. A bad mixing, which causes an inhomogeneous concentration and temperature in the gaseous stream at the inlet of the reactor, reduces the yield and process selectivity due to the formation of undesired products and also accelerates the aging rate of the catalyst.

Furthermore, in order to reduce the energy consumption and investment costs of the upstream equipment, it is required that the mixing between ethylbenzene and steam takes place with a pressure drop which is as low as possible.

Mixers for styrene monomer plants are normally structured as follows. One of the two gases (A) is used as main stream and passed into a chamber from whose walls the second gas (B) is injected. The turbulence (often increased by means of suitable promoters) and the elongated form of the chamber allow the two gases to mix. At the end of the chamber there is a static mixer to further enhance the homogeneity. It can be said that this mixing method substantially exploits the turbulent diffusion on the scale of the total diameter of the equipment.

Some mixing devices are known in literature—see, for example, international patent application WO 01/97960 or European patents EP 303,438 and EP 1,180,393—comprising perforated tube bundles, used for mixing fluids, to be subsequently sent to a reaction area, for example a catalytic bed. The types of mixers proposed, however, under low-pressure-drop conditions inside the single tube, do not assure uniform distribution of the flow between the various tubes of the bundle and therefore do not allow a high mixing degree to be obtained, with low energy consumption.

The Applicant has now found a new type of mixer for gases, which represents an alternative to the industrial models used in styrene plants or those of the known art, which allows a good mixing to be obtained, by means of a more compact and economic solution, with very low pressure-drops, without the necessity of availing of a static mixer downstream. Therefore this new mixer is also easily adaptable to the debottlenecking of existing plants, where it is desirable to improve the mixing but there is no large space available.

An object of the present invention therefore relates to a mixing device for two gases/vapours (hereinafter gases) comprising:
a. a plurality of tubes in a bundle, each equipped, in its initial portion, with a plurality of side holes;
b. a first feeding system of one of the two gases comprising a first tubular body situated at the inlet of the tubes; and
c. a second feeding system of the second gas, comprising a second tubular body that envelopes in a gas-proof way the tube bundle and at least part of the first tubular body;
characterized in that:
d. the first feeding system of one of the two gases comprises a plurality of fins, inside the first tubular body, which allow a uniform distribution of the feeding gas to the single tube.

According to the mixing device, object of the present invention, the tubes of the bundle are made of steel or another metal alloy, for example nickel alloy. They are cylindrically shaped, or preferably conical, diverging from the inlet towards the outlet, their length ranges from 0.5 to 3 meters and the average inner diameter ranges from 5 to 25 cm. The tubes of the bundle are arranged parallel to each other or, preferably, diverging towards the outlet of the bundle.

The initial part of each tube, for example from 10 to 50% of its total length, contains a plurality of holes, each ranging from 5 to 50 cm², preferably from 10 to 30 cm². The axis of the holes can be perpendicular to the relative tube axis or can form an angle with the latter, preferably ranging from 30 to 60°.

The tube bundle is generally contained between two perforated inlet and outlet tubesheets, preferably made of the same material as the tube bundle. These tubesheets can have a flat circular shape or be in the form of a spherical cap, and each of the holes is suitable for containing each of the tubes of the bundle.

The first feeding system comprises a first tubular body or element inside which one of the two gases to be mixed is fed, which is coupled and seal-fixed to the tubesheet at the inlet of the tube bundle.

The second feeding system comprises a second tubular body or element, inside which the other of the two gases to be mixed is fed, which envelopes in a gas proof way the tube bundle, on the outlet tubesheet.

The two tubular bodies can be coaxial. In this case, the second tubular body fully englobes both the tube bundle and the first tubular body.

Alternatively, the axis of the first tubular element can form an angle α with the axis of the second tubular element, ranging from 0 to 90°, or from −90 to 0°, depending on whether the projection on the horizontal plane of the first tubular element is to the left or to the right of the projection of the second tubular element. In this case, the second tubular body completely englobes the tube bundle and only partially the first tubular body.

The first feeding system of one of the two gases guarantees a uniform flow of this gas between all the bundle tubes, maintaining low pressure drops. This result is obtained thanks to the presence of a plurality of fins, suitably shaped, arranged on a transversal section, inside the first tubular body.

The number of fins ranges from 4 to 15.

In particular, said fins consist of thin plates, arc-shaped, with the centre angle β, ranging from 0 to α+10°, when α ranges from 0 to 90°, or the symmetrical correspondent, when α is between −90 and 0°. In this case, the transversal section of the arrangement of the fins is that which substantially passes through the point where the two axes of the two tubular bodies meet.

When α is zero (the two tubular bodies are coaxial) β is also equal to zero.

The second tubular body forms a closed casing which envelopes in a gas proof way the tube bundle and the two tubesheets and, at least partially, the first tubular body. One of the two gases to be mixed with the other is charged inside the closed casing through a feeding section. The pressure inside the casing is maintained higher than that present in the tubes so that the gas of the casing flows inside the tubes through the side holes.

Thanks to this subdivision and recombination mechanism, a sort of pre-mixing of the two gaseous streams is created on a large scale, and this allows the mixing of the two gases to be completed in chambers having reduced dimensions. These reduced mixing chambers are the portion of the tubes downstream of the perforated portions, where, thanks to the turbulent diffusivity on the reduced scale of the tube diameter, the close mixing of the two gases is obtained and, thanks to the reduced length, to the possible conical shape and to the orientation of the holes, the pressure drops are very low.

A process for the mixing of two gases/vapours (hereinafter gases) represents a further object of the present invention, comprising:

i. arranging a bundle of tubes with a cylindrical section or, preferably, conical section, equipped with a plurality of side holes in their initial part, in a sealed casing with a feeding section of one of the two gases;
ii. feeding in continuous into each tube the second of the two gases through a feeding system including a tubular body and, in its interior, a plurality of directional fins which allow the uniform distribution of the stream of said second gas inside the single tubes;
iii. feeding in continuous said first gas inside the closed casing through the feeding section; and
iv. maintaining a gas pressure inside the closed casing, which is such as to allow said first gas to flow inside said tubes through the side holes.

According to the process, object of the present invention, in the case of the production of styrene, one of the gases consists of steam at a temperature ranging from 550 to 900° C., preferably from 650 to 850° C., and the other gas is ethylbenzene, preheated to 400-600° C., preferably between 450 and 550° C.

At the outlet of the mixing chambers, the two gases perfectly mixed, are discharged directly into the dehydrogenation reactor which operates under conventional operating conditions.

The present invention is now illustrated, for exemplifying and non-limiting purposes, through the following embodiment which refers to the enclosed FIGURE.

In the FIGURE, (1) represents the tube bundle consisting of a plurality of diverging tubes (2) kept assembled by means of the two inlet (3) and outlet (4) tubesheets. Each tube has, in its initial portion, a plurality of holes (5).

The first tubular body (6) is connected to the tubesheets (3), whereas the second tubular body (7) envelopes in a gas proof way the outlet tubesheets (4). The axes of the bodies form an angle α of about 45°. The direction fins (8) are situated on the transversal section of the first tubular body, at the intersection of the two axes.

The functioning of the mixing device, object of present invention, is evident from the enclosed scheme and the above description.

One gas is fed to the first tubular body (6), for example steam at a high temperature, through the feeding section A. Another gas is fed to the second tubular body (7), for example ethylbenzene at a high temperature, through the feeding section B.

The steam is uniformly distributed inside the mixing tubes (2) thanks to the directional fins (8) which allow a homogeneous distribution of steam in each tube of the mixer.

Ethylbenzene is fed to the second tubular body, at a pressure slightly higher than that of the steam feeding, so that it penetrates inside the mixing tubes through the holes (5). The ethylbenzene is entrained by the steam inside the tubes where, thanks to the turbulent diffusivity on a reduced scale of the tube diameter, the close mixing of the two gases is obtained.

The gas mix is discharged through the exit section C and fed to the reaction reactor (not shown).

EXAMPLE

A bundle of 100 tubes, each having a conical longitudinal section (1), with a length of 1.2 m, an average inner diameter of 10 cm, is inserted in a tubular body or closed casing (7) of 8 m$^3$. The initial portion of each tube, 50 cm long, contains 10 holes (5), each 15 cm$^2$, homogeneously distributed on the surface of the initial portion of the tube (2).

Water vapour is fed at 700° C. inside the tubes by means of the feeding section (A) of a tubular body (6) situated on one side of the mixer. Ethylbenzene is charged, at a temperature of 500° C., by means of a feeding section (B) positioned on the casing (7), a pressure of ethylbenzene of 0.08 MPa being maintained inside the casing.

A gaseous mix is discharged at the outlet of the tubes (C), which is directly fed to a dehydrogenation reactor operating under the following conditions:

Catalyst: iron oxides, potassium oxides;
Temperature: 600° C.;
Pressure: 0.06 MPa;
Steam/ethylbenzene ratio: 1.45; LHSV: 0.95 h$^{-1}$.

A flow-rate of 23,500 kg/h of styrene with a selectivity of 95.3% is obtained at the outlet of the dehydrogenation reactor.

The same flow-rates of steam and ethylbenzene, substantially under the same thermodynamic conditions mentioned above, are fed to a traditional mixer consisting of a single tube, 1.5 m long, with an inner diameter of 200 cm equipped with a side inlet.

The steam is fed to the main inlet of the tube, whereas ethylbenzene is fed from the side inlet.

At the end of the tube, is installed a static mixer consisting of 4 mixing layers, each 0.60 m high (for a total of 2.4 m) and with a diameter of 210 cm. The mixture thus obtained is fed to the dehydrogenation reactor which operates under the same conditions indicated above.

23,500 kg/h of styrene are obtained, with a selectivity of 94.4% (with a higher consumption of ethylbenzene of about 10 kg for each ton of styrene produced), or with an alternative running condition, it is possible to obtain 23,500 kg/h of styrene, with a selectivity of 95.3% but an additional steam consumption of about 5,000 kg/h.

The invention claimed is:

1. A mixing device for two gases comprising:
   a. a plurality of tubes arranged in a bundle, each provided, in an initial portion, with a plurality of side holes;
   b. a first feeding system of one of the two gases, comprising a first tubular body situated on an inlet side of the tubes; and
   c. a second feeding system of the other gas comprising a second tubular body that envelopes in a gas-proof way the tube bundle and at least a portion of the first tubular body;
   wherein
   the first feeding system of one of the gases comprises a plurality of fins, inside the first tubular body to allow a uniform distribution of the feeding gas to the single tubes; and the tubes of the tube bundle are conical, diverging from the inlet towards the outlet.

2. The device according to claim 1, wherein the plurality of holes is present on the initial portion of each tube of the tube bundle, ranging from about 10 to 50% of the total length.

3. The device according to claim 1, wherein all the holes of the tubes of the tube bundle have a surface ranging from 5 to 50 cm$^2$.

4. The device according to claim 2, wherein the axis of the holes is perpendicular to the axis of the relative tube, or it forms an angle with the latter ranging from 30 to 60°.

5. The device according to claim 1, wherein the tube bundle is contained between two inlet and outlet tubesheets.

6. The device according to claim 1, wherein the first feeding system comprises a first tubular body which is coupled and seal-fixed to the tube sheet at the inlet of the tube bundle.

7. The device according to claim 1, wherein the second feeding system comprises a second tubular body which envelopes in a gas proof way the tube bundle on the outlet tubesheet to englobe said tube bundle and the first tubular body.

8. The device according to claim 1, wherein the first tubular body and the second tubular body are coaxial.

9. The device according to claim 1, wherein the axis of the first tubular body forms with the axis of the second tubular body an angle α ranging from 0 to 90°, or from −90 to 0°.

10. The device according to claim 1, wherein the fins of the first feeding system consist of thin arc-shaped plates, with a centre angle β ranging from 0 to α+10° when α ranges from 0 to 90°, or the symmetric correspondent, when α ranges from −90 to 0°.

11. A process for the mixing of two gases, comprising:
 i. arranging a bundle of tubes having a conical section diverging from the inlet towards the outlet, equipped with a plurality of side holes in an initial part, in a sealed casing with a feeding section of one of the two gases;
 ii. feeding in continuous, inside each tube, the second of the two gases through a feeding system comprising a tubular body and, in an interior of the tubular body, a plurality of directional fins which allow the uniform distribution of the stream of said second gas inside the single tubes;
 iii. feeding in continuous said first gas inside the closed casing through the feeding section; and
 iv. maintaining, inside the closed casing, a pressure of the gas to allow said first gas to flow inside said tubes, through the side holes.

12. The process according to claim 11, wherein one of the two gases is steam at a temperature ranging from 550 to 900° C. whereas the other gas is ethylbenzene pre-heated to 400-600° C.

* * * * *